United States Patent
Lee et al.

(10) Patent No.: US 8,873,921 B2
(45) Date of Patent: Oct. 28, 2014

(54) OPTICAL FIBER ADAPTER SECURITY, OPTICAL FIBER CONNECTOR SECURITY, AND REMOVAL TOOL FOR USE THEREWITH

(71) Applicant: Hsing Chau Industrial Co., Ltd., Taipei (TW)

(72) Inventors: Kihai Lee, Taipei (TW); Jerry Su, Taipei (TW)

(73) Assignee: Hsing Chau Industrial Co., Ltd. (TW)

( * ) Notice: Subject to any disclaimer, the term of this patent is extended or adjusted under 35 U.S.C. 154(b) by 119 days.

(21) Appl. No.: 13/707,653

(22) Filed: Dec. 7, 2012

(65) Prior Publication Data

US 2014/0161407 A1  Jun. 12, 2014

(51) Int. Cl.
  *G02B 6/00* (2006.01)
  *G02B 6/38* (2006.01)
(52) U.S. Cl.
  CPC ............ *G02B 6/3825* (2013.01); *G02B 6/3849* (2013.01)
  USPC ........................................................ 385/134
(58) Field of Classification Search
  None
  See application file for complete search history.

(56) References Cited

U.S. PATENT DOCUMENTS

| 2004/0218885 | A1* | 11/2004 | Segroves et al. | 385/134 |
| 2005/0276560 | A1* | 12/2005 | Reinert et al. | 385/134 |
| 2009/0226140 | A1* | 9/2009 | Belenkiy et al. | 385/134 |
| 2010/0232756 | A1* | 9/2010 | Hackett | 385/134 |

* cited by examiner

*Primary Examiner* — Hemang Sanghavi
(74) *Attorney, Agent, or Firm* — Schmeiser, Olsen & Watts, LLP

(57) ABSTRACT

An optical fiber adapter security, an optical fiber connector security, and a removal tool for use therewith are introduced. The removal tool includes a first body and two second resilient arms. The first body has a first coupling unit. The first coupling unit matches the optical fiber connector security. The second resilient arms are connected to the first body and connected to second coupling units, respectively. The second resilient arms match the optical fiber connector security. The second resilient arms and the second coupling units together match the optical fiber adapter security. The optical fiber adapter security prevents improper use of the optical fiber adapter. The optical fiber connector security prevents inappropriate removal of the optical fiber connector set. Protection provided by the optical fiber adapter security and the optical fiber connector security can be disabled by the same removal tool.

8 Claims, 17 Drawing Sheets

OPTICAL FIBER ADAPTER SECURITY, OPTICAL FIBER CONNECTOR SECURITY, AND REMOVAL TOOL FOR USE THEREWITH

FIELD OF TECHNOLOGY

The present invention relates to optical fiber adapter securities, optical fiber connector securities, and removal tools for use therewith, and more particularly, to an optical fiber adapter security and an optical fiber connector security whose protection is disabled by the same removal tool.

BACKGROUND

Referring to FIG. 1 through FIG. 3, a conventional optical fiber adapter 1 has two slots 11. The slots 11 each have therein two slits 111 positioned side by side. A conventional optical fiber connector set 20 has two optical fiber connectors 2. The optical fiber connectors 2 each have a fifth resilient arm 21. The fifth resilient arms 21 each have therein two fifth protruding portions 211 positioned side by side. Referring to FIG. 4 through FIG. 5, after the conventional optical fiber adapter 1 and the conventional optical fiber connector set 20 have been put together, the fifth protruding portions 211 are engaged with the slits 111, respectively, to allow the conventional optical fiber connector set 20 to be fixed to the conventional optical fiber adapter 1. To separate the conventional optical fiber connector set 20 and the conventional optical fiber adapter 1, a user presses the fifth resilient arms 21 to separate the fifth protruding portions 211 from the slits 111, and then the user gives a pull to the optical fiber connectors 2 so as to separate the conventional optical fiber connector set 20 and the conventional optical fiber adapter 1. However, the conventional optical fiber adapter 1 is likely to be abused when left unprotected, whereas the conventional optical fiber connector set 20 is likely to be removed inappropriately when left unprotected.

Accordingly, it is imperative to provide an optical fiber adapter security, an optical fiber connector security, and a removal tool for use therewith with a view to preventing improper use of the conventional optical fiber adapter and inappropriate removal of the conventional optical fiber connector set and disabling the protection provided by the optical fiber adapter security and the optical fiber connector security by means of a simple framework thereof.

SUMMARY

In view of the aforesaid drawbacks of the prior art, the inventor of the present invention conceived room for improvement in the prior art and thus conducted extensive researches and experiments according to the inventor's years of experience in the related industry, and finally developed an optical fiber adapter security, an optical fiber connector security, and a removal tool for use therewith with a view to preventing improper use of a conventional optical fiber adapter and inappropriate removal of a conventional optical fiber connector set and disabling the protection provided by the optical fiber adapter security and the optical fiber connector security by means of the same removal tool.

In order to achieve the above and other objectives, the first aspect of the present invention provides a removal tool for removing an optical fiber adapter security and an optical fiber connector security from an optical fiber connector set. The removal tool comprises: a first body having a first coupling unit matching the optical fiber connector security; two second resilient arms connected to the first body and matching the optical fiber connector security; and two second coupling units connected to the second resilient arms, respectively, wherein the second resilient arms and the second coupling units together match the optical fiber adapter security.

The second aspect of the present invention provides an optical fiber adapter security for use with the aforesaid removal tool. The optical fiber adapter security comprises: a lid; two extending pins connected to the lid and inserted into two slots of an optical fiber adapter, respectively; and two third resilient arms connected to the extending pins, respectively, the third resilient arms each having a third protruding portion and a third coupling unit, the third resilient arms being inserted into the slots, respectively, the third protruding portions being engaged with two slits of two said slots, respectively, wherein the second resilient arms of the removal tool are inserted into the slots, respectively, wherein the second coupling units of the removal tool separate the third protruding portions from the slits, respectively, and are coupled to the third coupling units, respectively.

The third aspect of the present invention provides an optical fiber connector security for use with the aforesaid removal tool. The optical fiber connector security comprises: a fourth body having a receiving channel with a fourth coupling unit and two fourth resilient arms, wherein two fifth resilient arms of the optical fiber connector set are inserted into the receiving channel, the fourth resilient arms being disposed above the fifth resilient arms, respectively, wherein the second resilient arms of the removal tool are inserted into the receiving channel to abut against the fourth resilient arms and press on the fifth resilient arms to thereby disconnect fifth protruding portions of the fifth resilient arms from slits of an optical fiber adapter, wherein the first coupling unit of the removal tool is coupled to the fourth coupling unit; and a snap engaging member connected to the fourth body and snap-engaged with the optical fiber connector set.

Accordingly, an optical fiber adapter security of the present invention prevents improper use of a conventional optical fiber adapter, whereas an optical fiber connector security of the present invention prevents inappropriate removal of a conventional optical fiber connector set, wherein the protection provided by the optical fiber adapter security and the optical fiber connector security can be disabled by the same removal tool.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION

Figure 6:
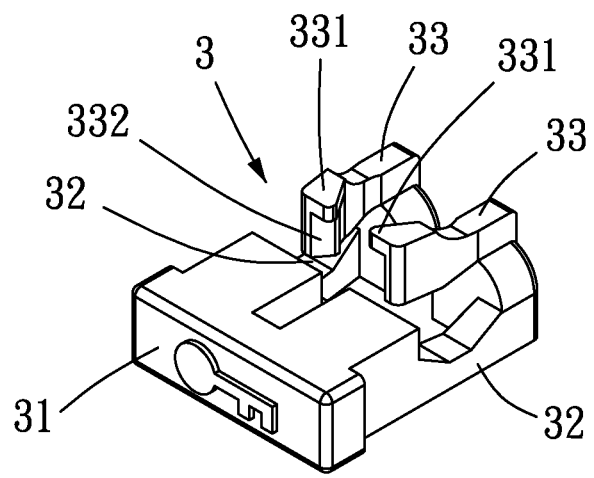
FIG. 6 is a schematic view of an optical fiber adapter security according to a specific embodiment of the present invention.
Figure 7:
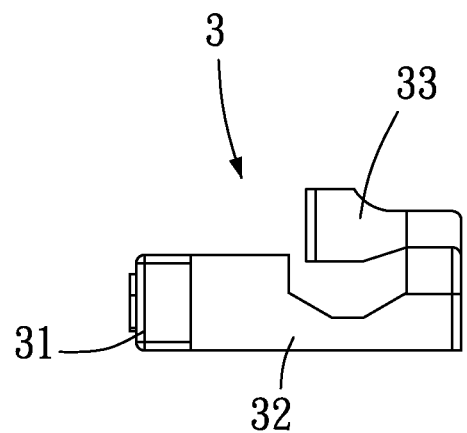
FIG. 7 is another schematic view of the optical fiber adapter security according to a specific embodiment of the present invention.
Figure 8:
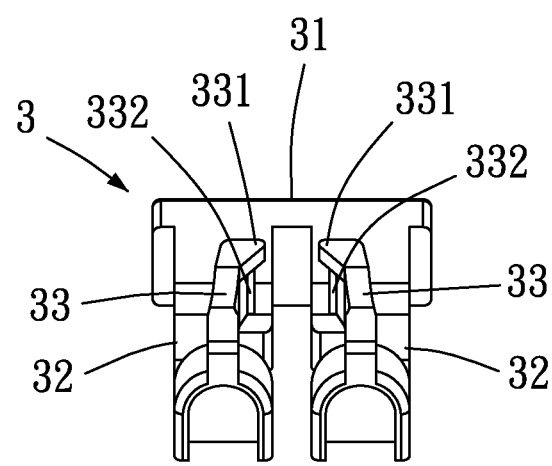
FIG. 8 is yet another schematic view of the optical fiber adapter security according to a specific embodiment of the present invention.
Figure 9:
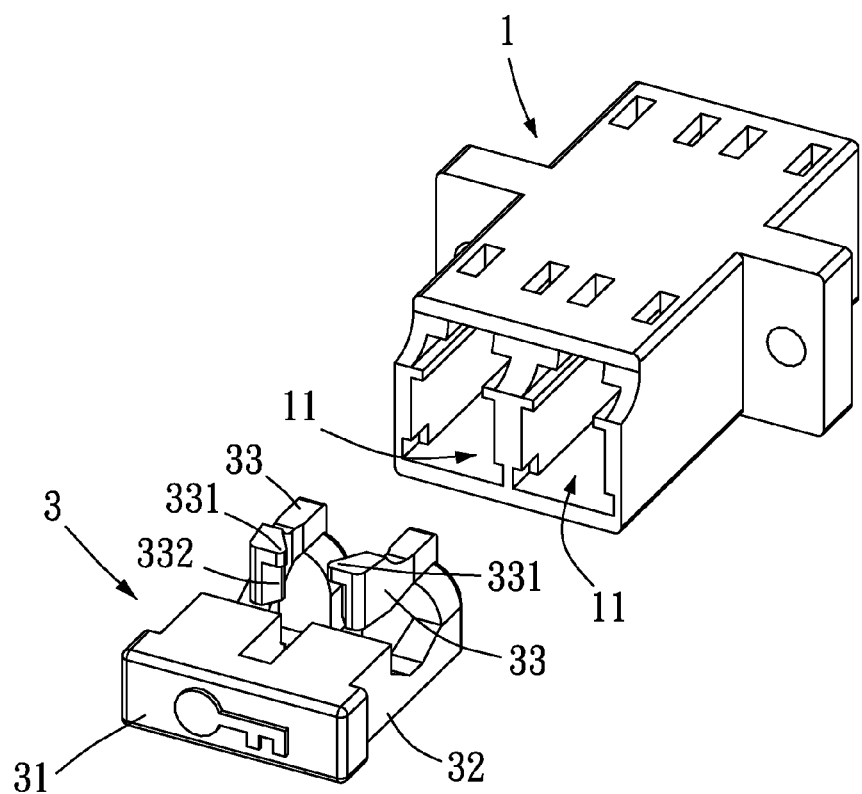
FIG. 9 is a schematic view of an optical fiber adapter and the optical fiber adapter security before assembly according to a specific embodiment of the present invention.
Figure 10:
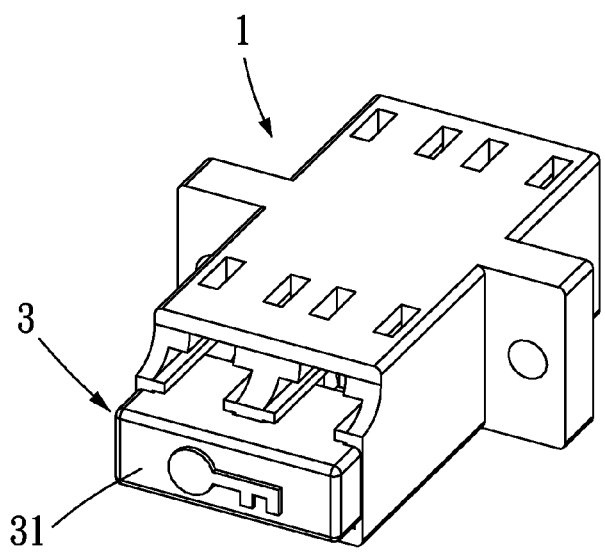
FIG. 10 is a schematic view of the optical fiber adapter and the optical fiber adapter security after assembly according to a specific embodiment of the present invention.
Figure 20:
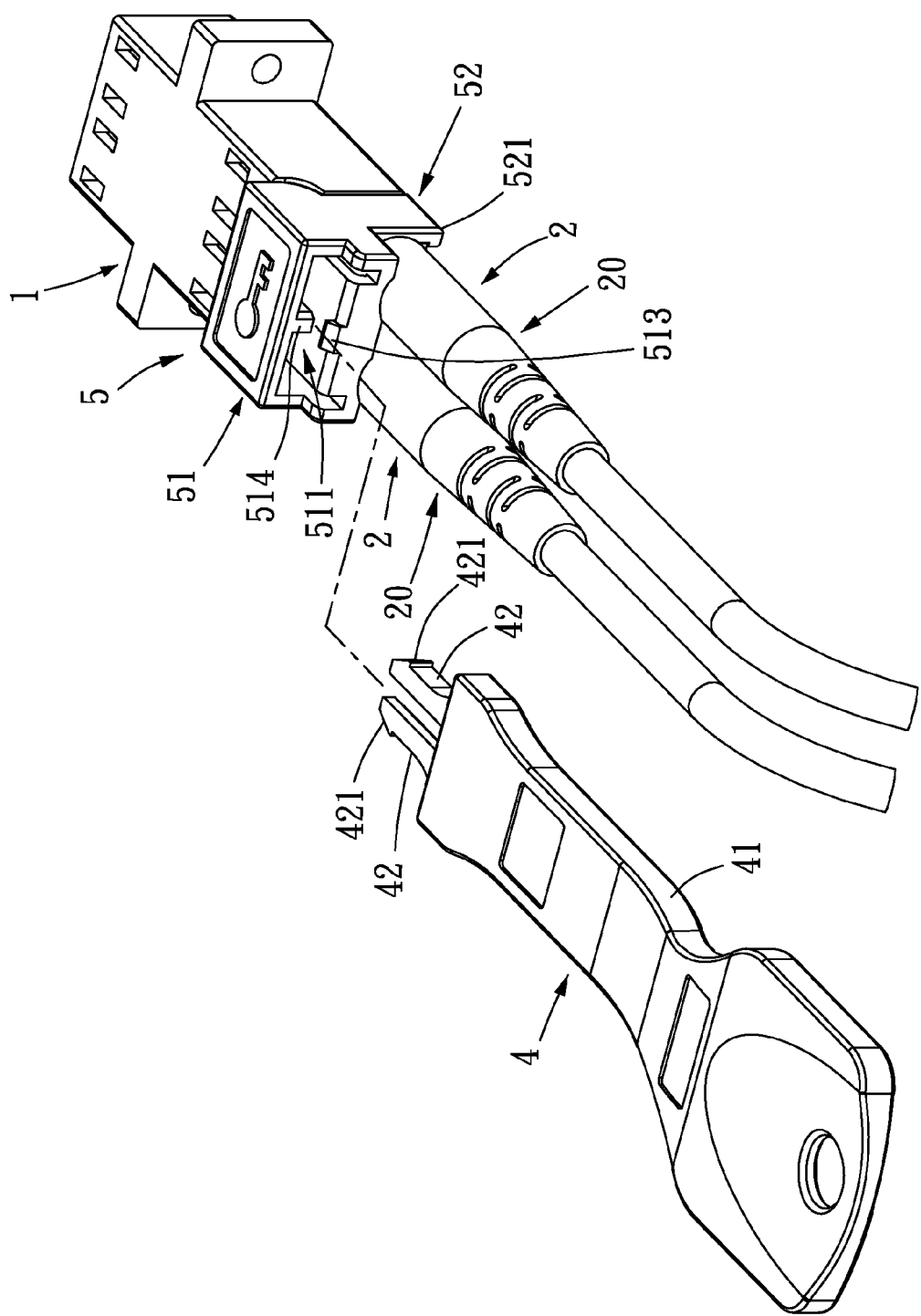
FIG. 20 is a schematic view of the removal tool before disabling protection provided by the optical fiber connector security according to a specific embodiment of the present invention.
Figure 21:
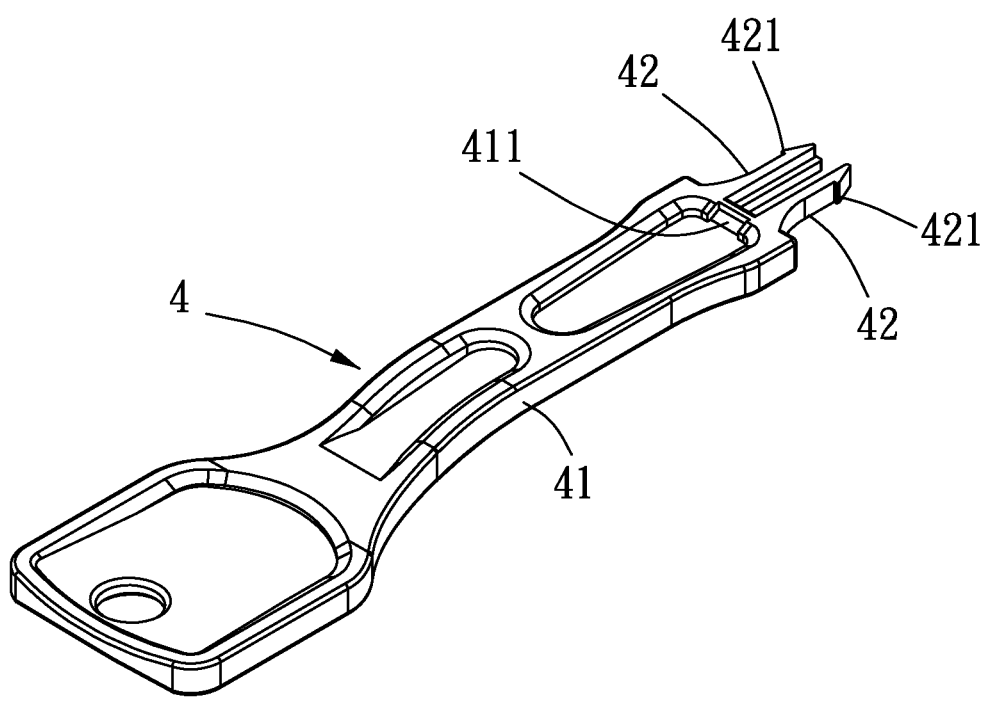
FIG. 21 is a schematic view of the removal tool viewed from the back according to a specific embodiment of the present invention.
Figure 22:
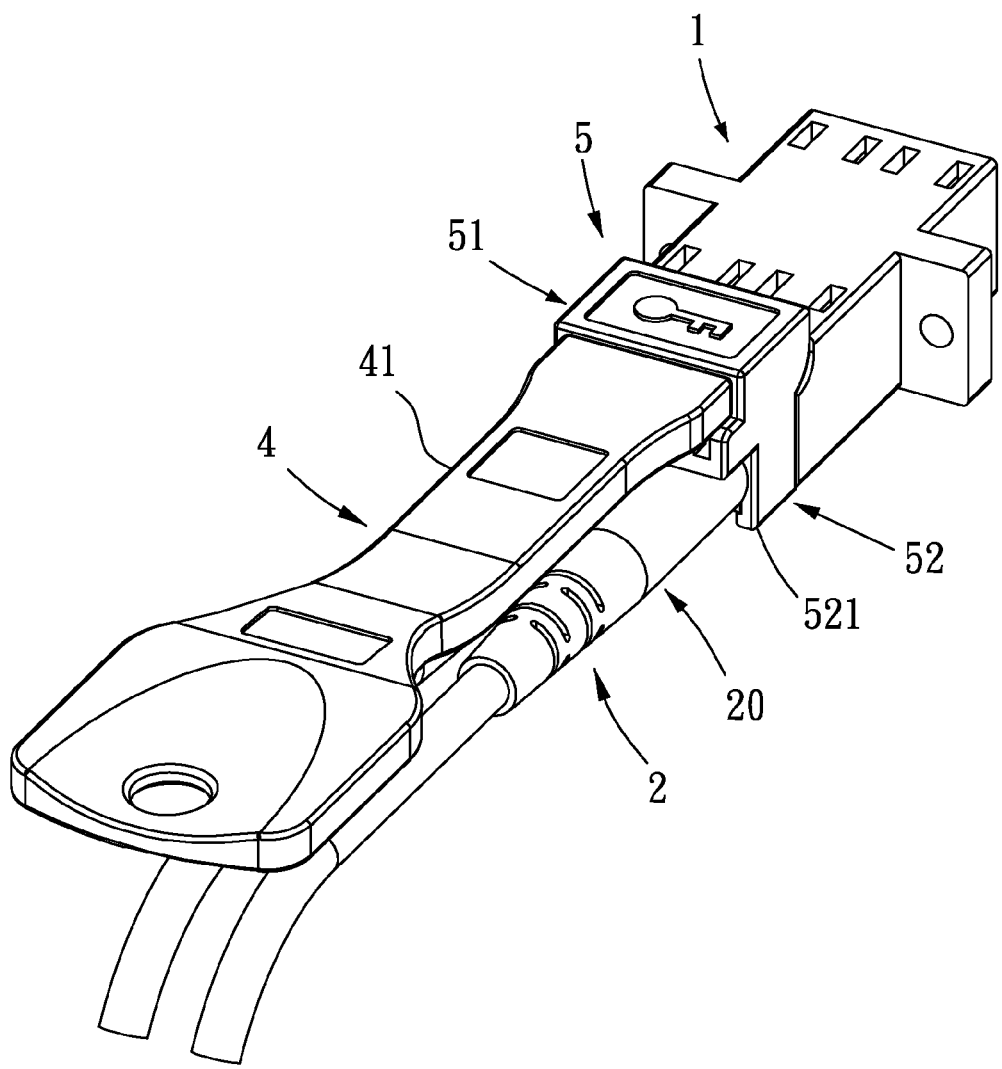
FIG. 22 is a schematic view of the removal tool after disabling protection provided by the optical fiber connector security according to a specific embodiment of the present invention.
Figure 23:
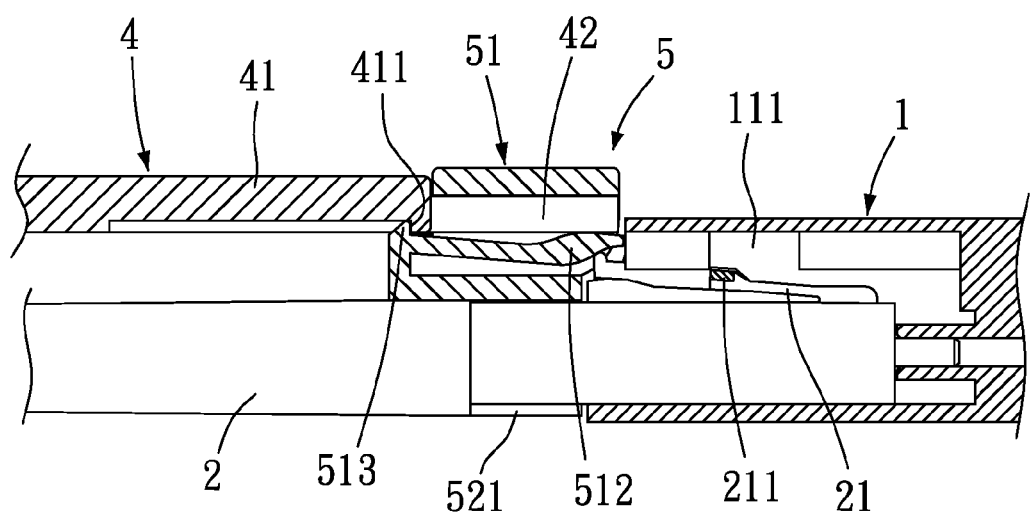
FIG. 23 is a cross-sectional view of the removal tool after disabling protection provided by the optical fiber connector security according to a specific embodiment of the present invention.

Referring to FIG. 20 through FIG. 21, the first aspect of the present invention provides a removal tool 4 for removing an optical fiber adapter security 3 (shown in FIG. 6) an an optical fiber connector security 5 from an optical fiber connector set 20. The removal tool 4 comprises a first body 41, two second resilient arms 42, and two second coupling units 421. The first body 41 is flat. A first coupling unit 411 is disposed at the end of the back of the first body 41. The first coupling unit 411 corresponds in position to the optical fiber connector security 5. The second resilient arms 42 are parallel and are spaced apart from each other. Ends of the second resilient arms 42 are connected to the end of the first body 41. The other ends of the second resilient arms 42 are connected to the second coupling units 421, respectively. The second resilient arms 42 match the optical fiber connector security 5. The second resilient arms 42 and the second coupling units 421 together match the optical fiber adapter security 3.

The first coupling unit 411 is a recess or a hook as needed.

The second coupling units 421 are hooks or recesses as needed.

Figure 1:
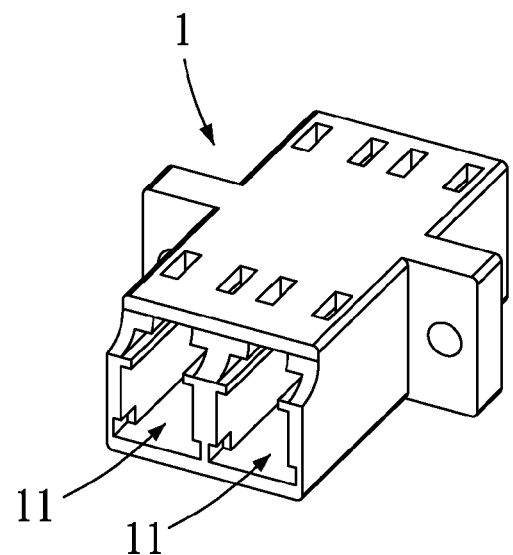
FIG. 1 (PRIOR ART) is a schematic view of a conventional optical fiber adapter.
Figure 2:
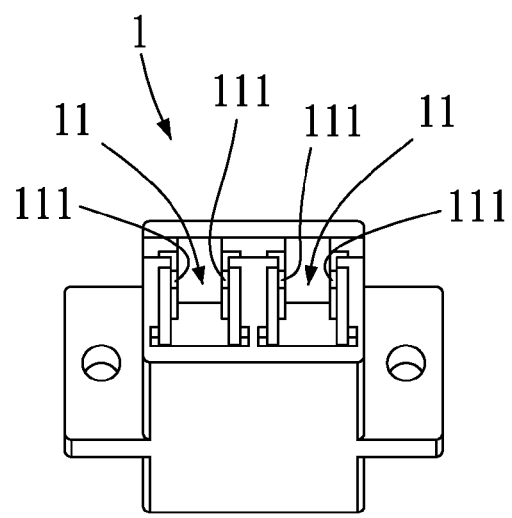
FIG. 2 (PRIOR ART) is another schematic view of the conventional optical fiber adapter.
Figure 3:
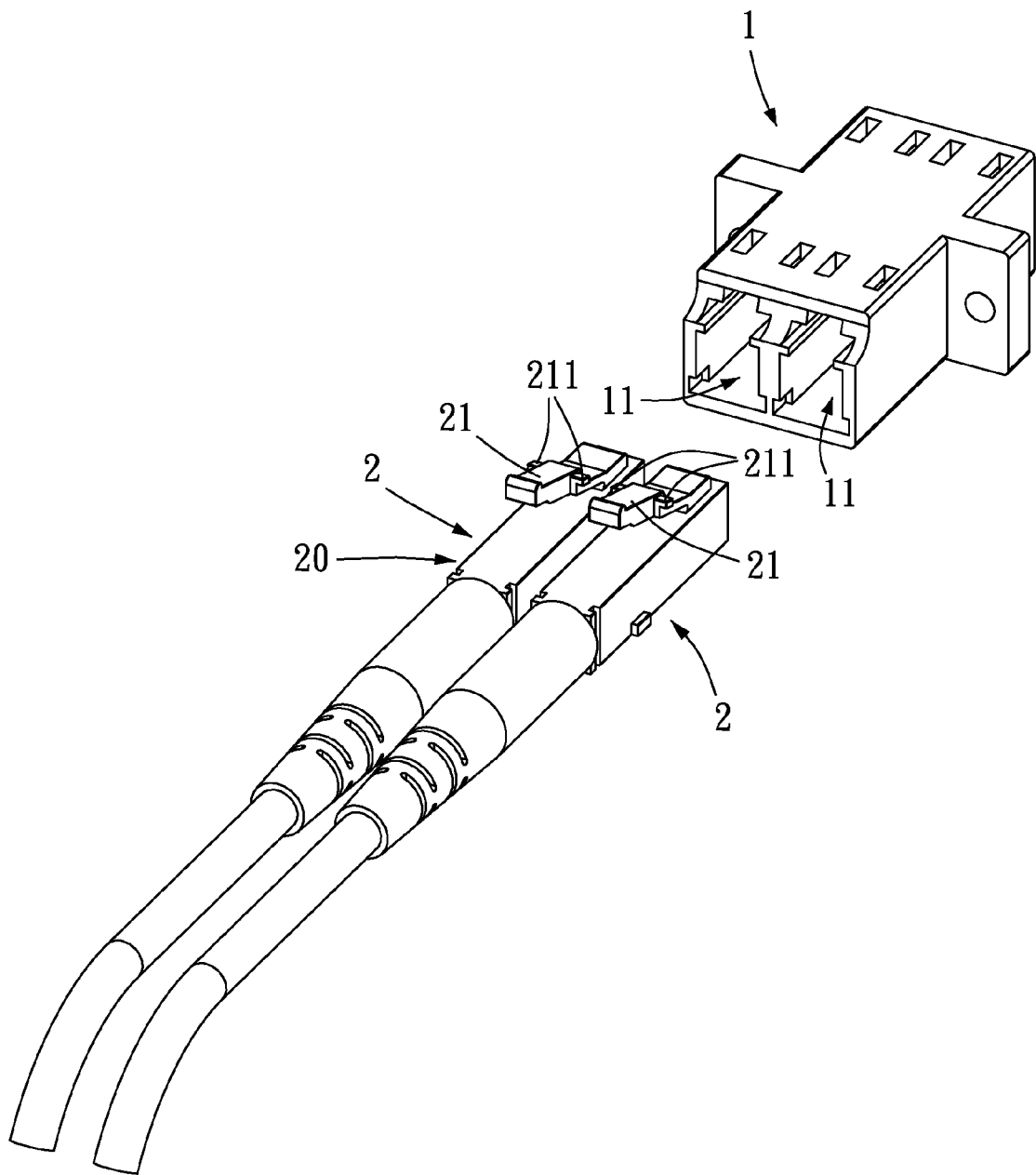
FIG. 3 (PRIOR ART) is a schematic view of the conventional optical fiber adapter and a conventional optical fiber connector set before assembly.
Figure 4:
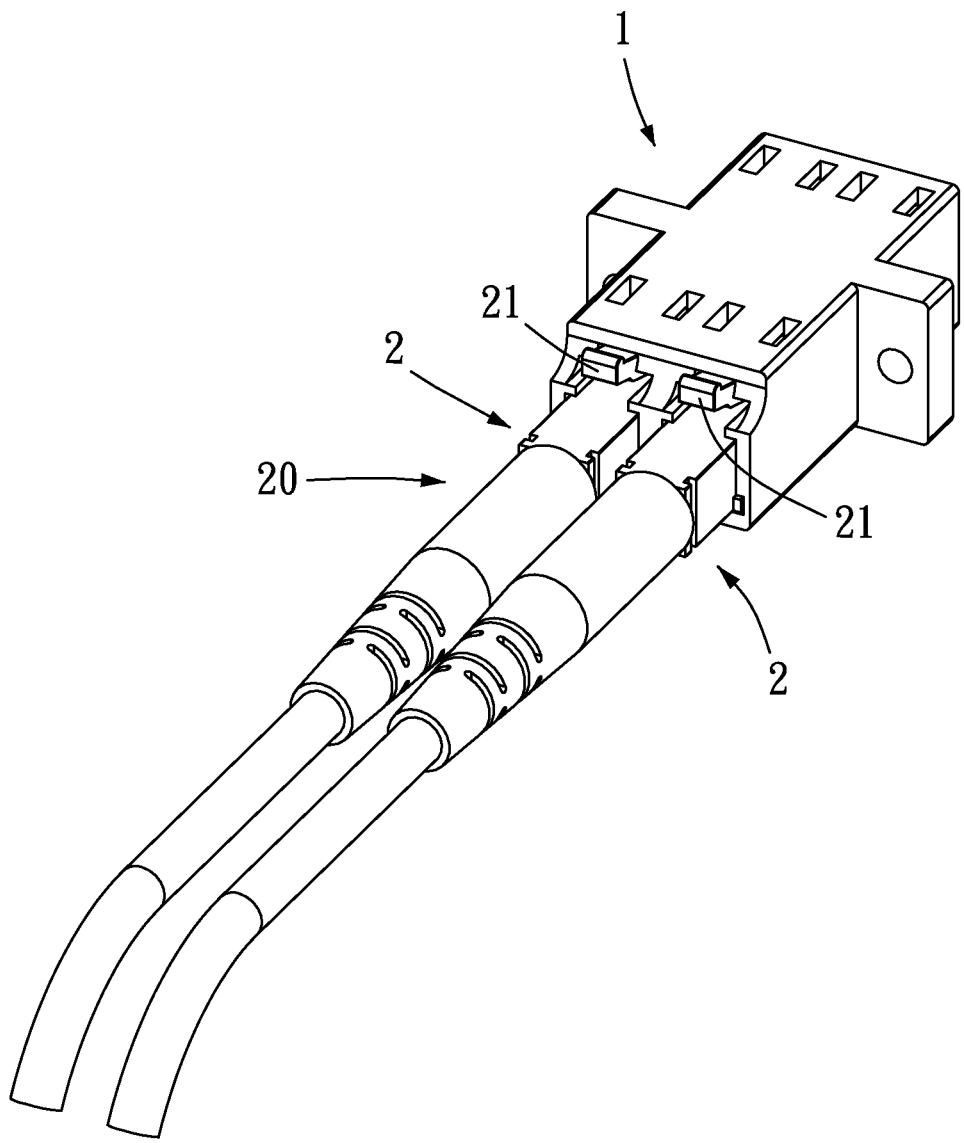
FIG. 4 (PRIOR ART) is a schematic view of the conventional optical fiber adapter and the conventional optical fiber connector set after assembly.
Figure 5:
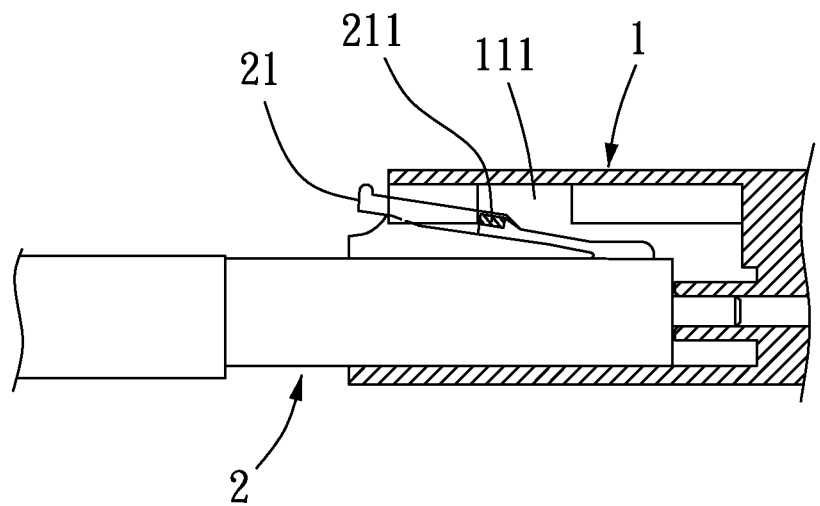
FIG. 5 (PRIOR ART) is a schematic cross-sectional view of the conventional optical fiber adapter and the conventional optical fiber connector set after assembly.

Referring to FIG. 6 through FIG. 10, the second aspect of the present invention provides an optical fiber adapter security 3 for use with the removal tool 4. The optical fiber adapter security 3 comprises a lid 31, two extending pins 32, and two third resilient arms 33. The extending pins 32 are parallel and are spaced apart from each other. The ends of the extending pins 32 are connected to the lid 31 from behind. The extending pins 32 can be inserted into two slots 11 of an optical fiber adapter 1 (shown in FIG. 9), respectively. The third resilient arms 33 are parallel and are spaced apart from each other. The ends of the third resilient arms 33 are connected to the other ends of the extending pins 32, respectively. The third resilient arms 33 are disposed above the extending pins 32. The other ends of the third resilient arms 33 each have a third protruding portion 331 and a third coupling unit 332. The third protruding portion 331 is disposed above the third coupling unit 332. The third resilient arms 33 are inserted into the slots 11, respectively. The third protruding portions 331 are each engaged with a slit 111 (see FIG. 2) in a corresponding one of the slots 11.

Figure 11:
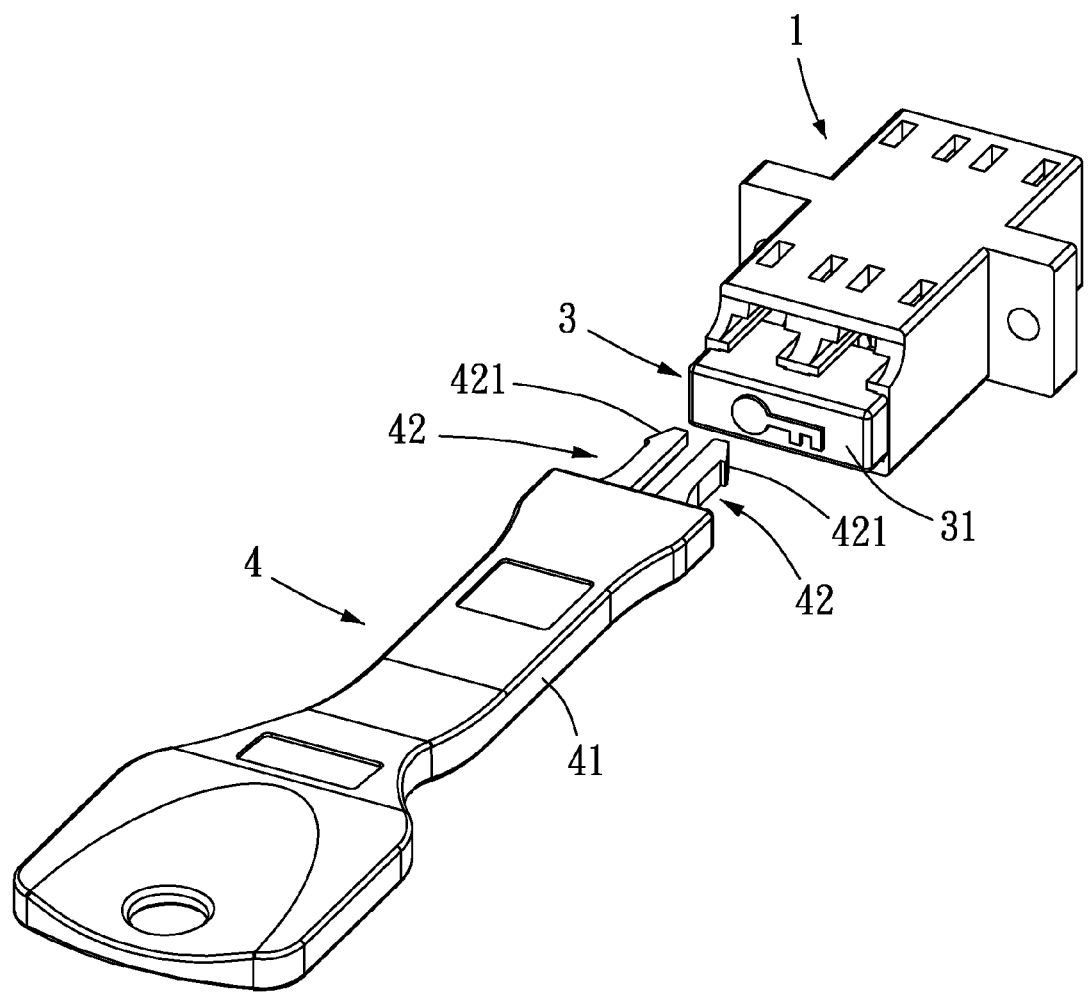
FIG. 11 is a schematic view of a removal tool before disabling protection provided by the optical fiber adapter security according to a specific embodiment of the present invention.
Figure 12:
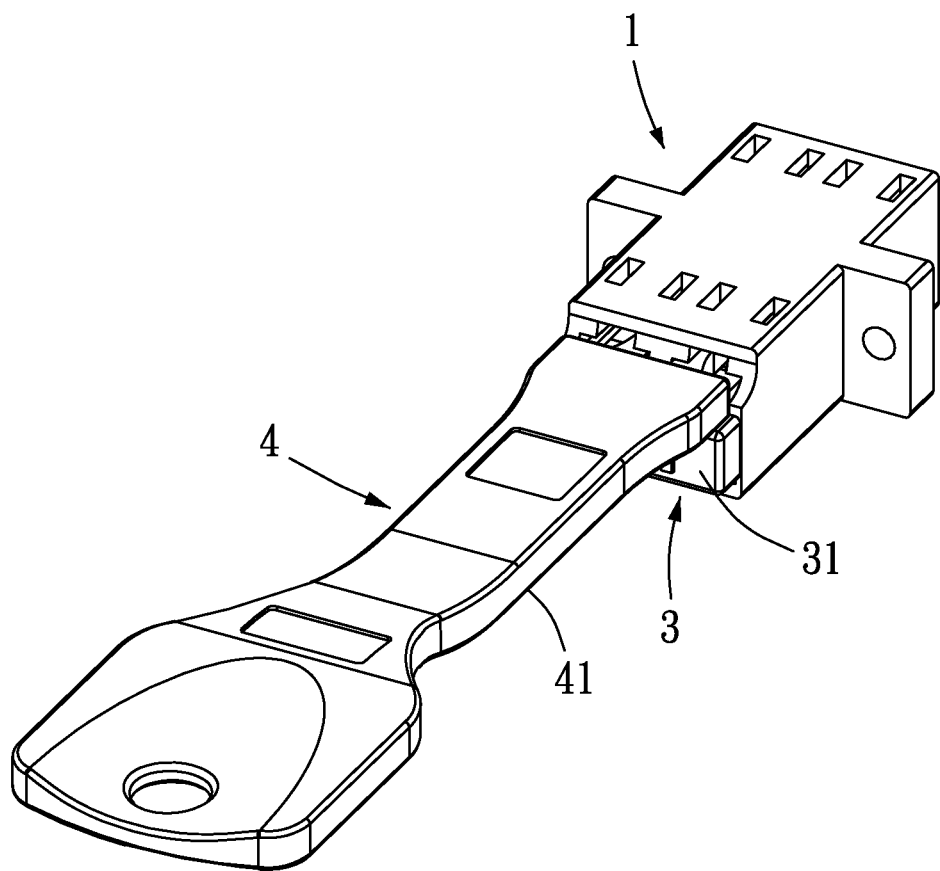
FIG. 12 is a schematic view of the removal tool after disabling protection provided by the optical fiber adapter security according to a specific embodiment of the present invention.
Figure 13:
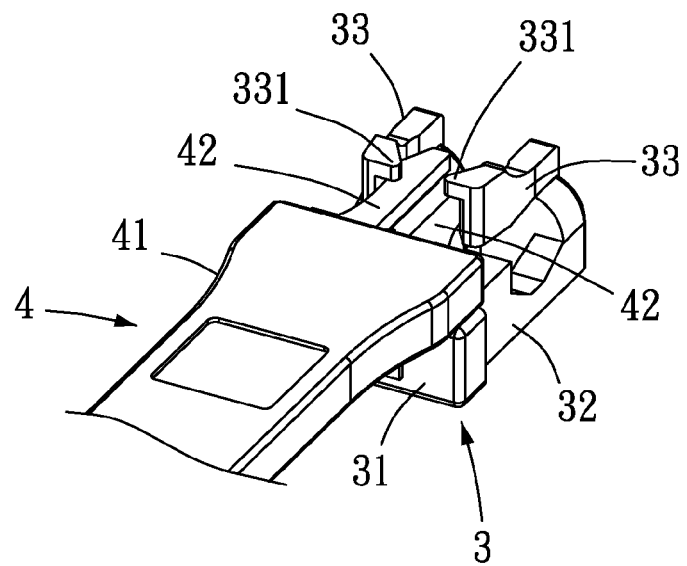
FIG. 13 is another schematic view of the removal tool after disabling protection provided by the optical fiber adapter security according to a specific embodiment of the present invention.
Figure 14:
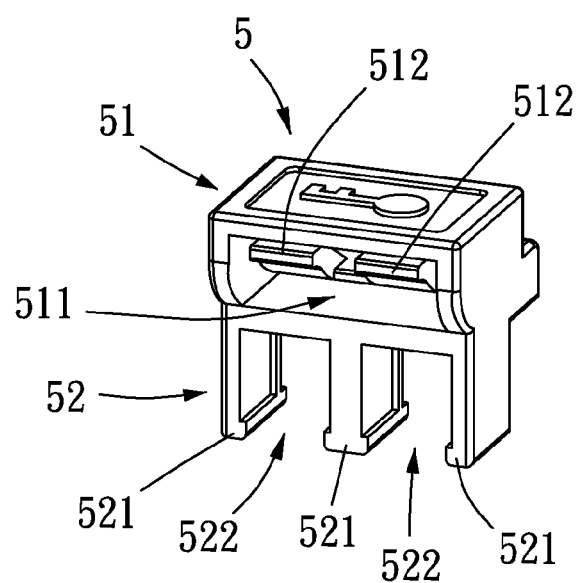
FIG. 14 is a schematic view of an optical fiber connector security according to a specific embodiment of the present invention.
Figure 15:
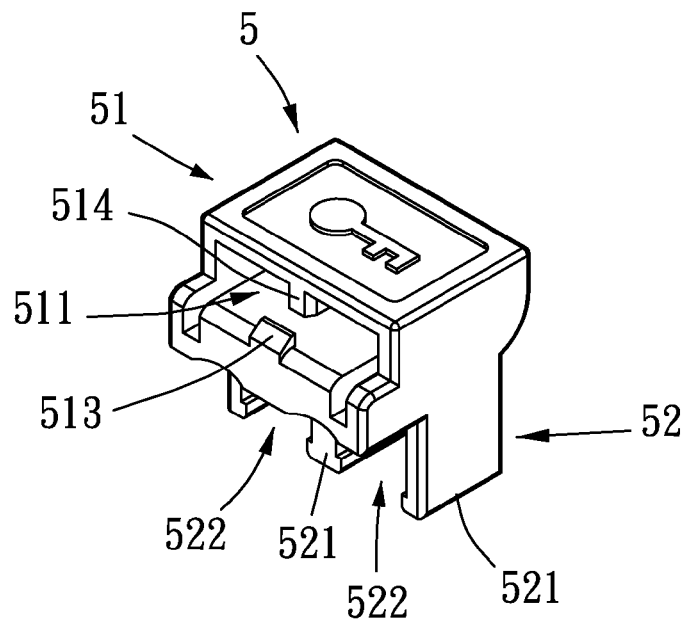
FIG. 15 is another schematic view of the optical fiber connector security according to a specific embodiment of the present invention.
Figure 16:
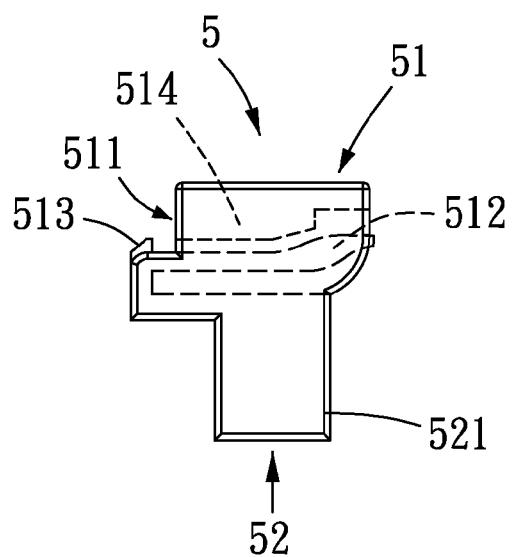
FIG. 16 is yet another schematic view of the optical fiber connector security according to a specific embodiment of the present invention.
Figure 17:
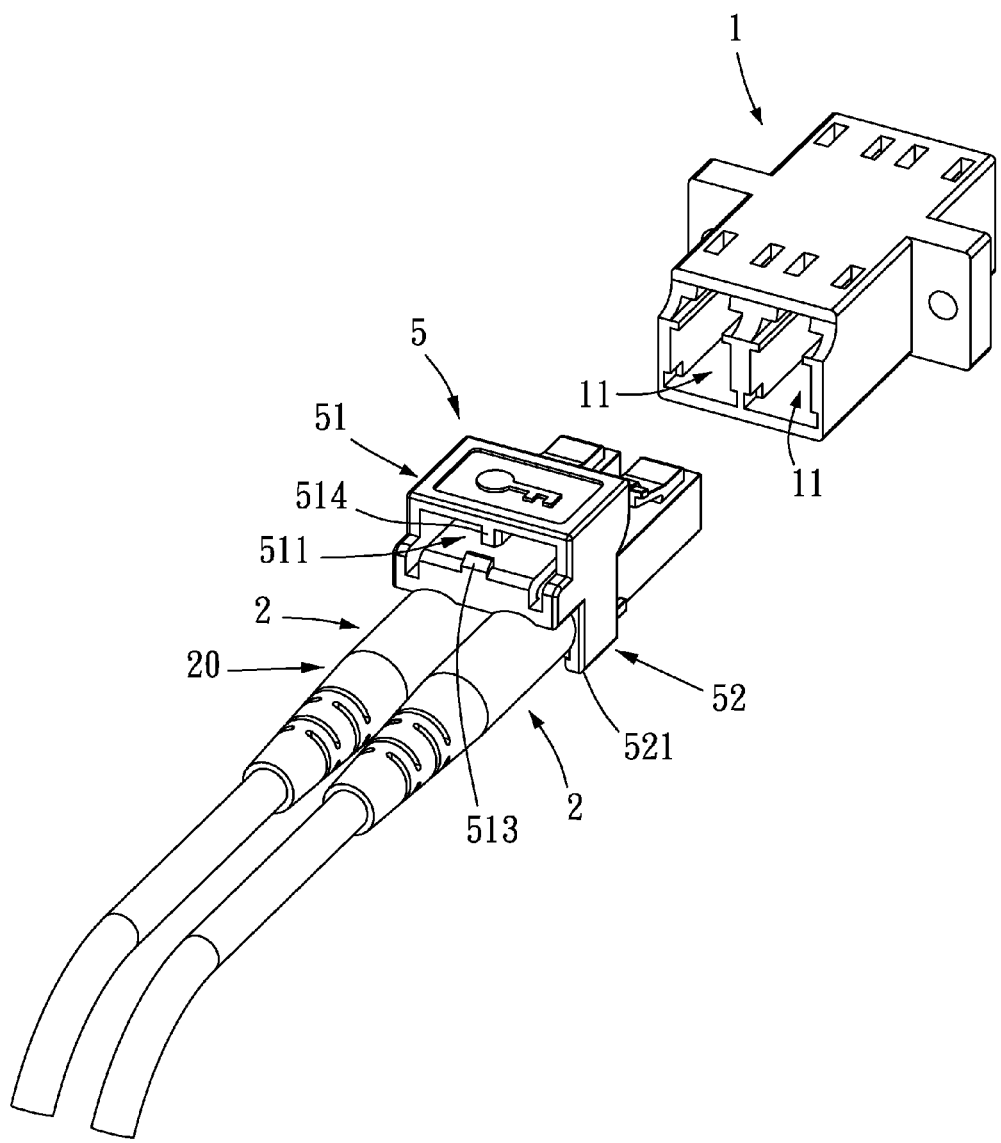
FIG. 17 is a schematic view of the optical fiber connector security and an optical fiber connector set which have been put together but not yet been coupled to the optical fiber adapter according to a specific embodiment of the present invention.
Figure 18:
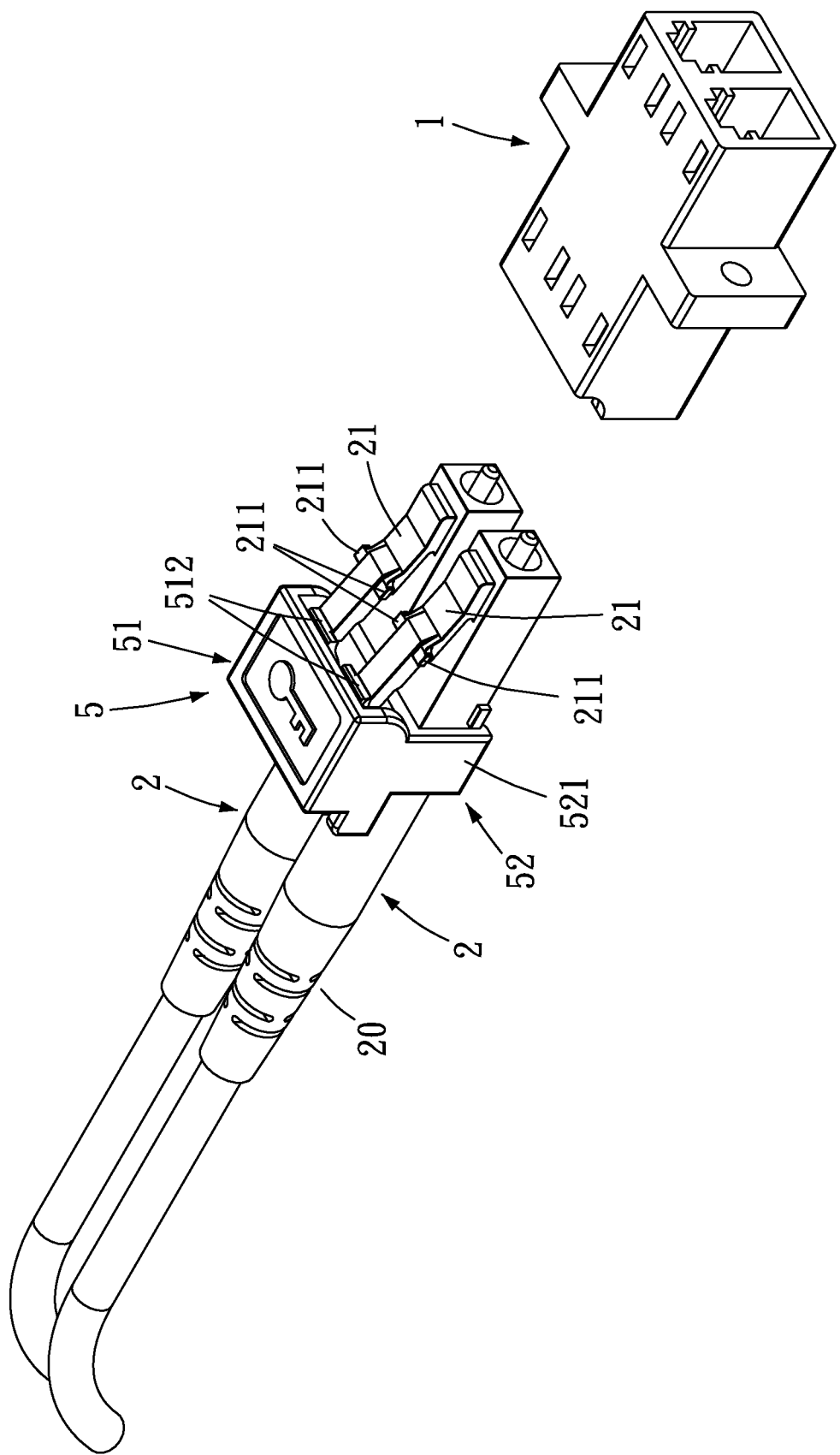
FIG. 18 is another schematic view of the optical fiber connector security and the optical fiber connector set which have been put together but not yet been coupled to the optical fiber adapter according to a specific embodiment of the present invention.
Figure 19:
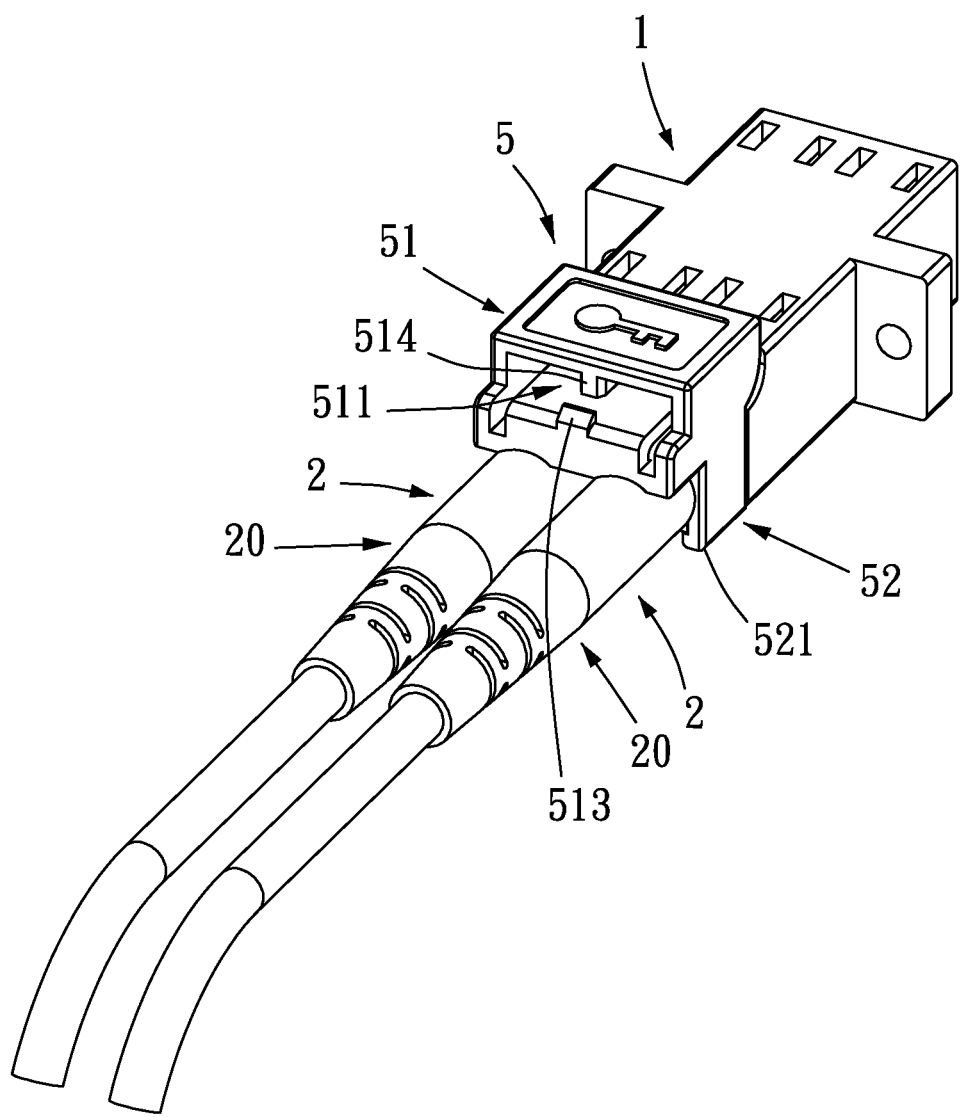
FIG. 19 is a schematic view of the optical fiber connector security and the optical fiber connector set which have been put together and then coupled to the optical fiber adapter according to a specific embodiment of the present invention.

Referring to FIG. 11 through FIG. 13, to disable the protection provided by the optical fiber adapter security 3, a user inserts the second resilient arms 42 of the removal tool 4 into portions of the slots 11, respectively, wherein the portions of the slots 11 are not hidden by the lid 31. When inserted, the second resilient arms 42 of the removal tool 4 are positioned between the third resilient arms 33. The second coupling units 421 of the removal tool 4 push the third protruding portions 331, so as to separate the third protruding portions 331 from the slits 111, respectively. Afterward, the second coupling units 421 are coupled to the third coupling units 332, respectively. Finally, the user gives a pull to the first body 41 of the removal tool 4, so as to remove the optical fiber adapter security 3 from the optical fiber adapter 1.

The second coupling units 421 and the third coupling units 332 are hooks. Alternatively, the second coupling units 421 and the third coupling units 332 are hooks and recesses, respectively. Alternatively, the second coupling units 421 and the third coupling units 332 are recesses and hooks, respectively. The aforesaid options are chosen as needed.

Referring to FIG. 14 through FIG. 19, the third aspect of the present invention provides an optical fiber connector security 5 for use with the removal tool 4. The optical fiber connector security 5 comprises a fourth body 51 and a snap engaging member 52. The fourth body 51 has a receiving channel 511. The receiving channel 511 has two openings corresponding in position to the two sides of the fourth body 51, respectively. A fourth coupling unit 513 and two fourth resilient arms 512 are disposed at the receiving channel 511.

The fourth coupling unit 513 lies in front of the fourth resilient arms 512. The fourth resilient arms 512 extend from the front opening of the receiving channel 511 to the rear opening of the receiving channel 511. The ends of two fifth resilient arms 21 of the optical fiber connector set 20 are inserted into the rear opening of the receiving channel 511. The ends of the fourth resilient arms 512 are disposed above the ends of the fifth resilient arms 21, respectively. The snap engaging member 52 is connected to the fourth body 51 from below. The snap engaging member 52 can be snap-engaged with the optical fiber connector set 20.

Referring to FIG. 20 through FIG. 23, to disable the protection provided by the optical fiber connector security 5, the user inserts the second resilient arms 42 of the removal tool 4 into the receiving channel 511 through the front opening of the receiving channel 511 until the second resilient arms 42 abut against the fourth resilient arms 512 and press on the fifth resilient arms 21 to thereby disconnect fifth protruding portions 211 of the fifth resilient arms 21 from the slits 111 of the optical fiber adapter 1, respectively. After the first coupling unit 411 of the removal tool 4 has been coupled to the fourth coupling unit 513, the user gives a pull to the first body 41 of the removal tool 4 to remove from the optical fiber adapter 1 the optical fiber connector set 20 coupled to the optical fiber connector security 5.

The first coupling unit 411 is a recess, whereas the fourth coupling unit 513 is a hook. Alternatively, the first coupling unit 411 is a hook, whereas the fourth coupling unit 513 is a recess. The aforesaid options are chosen as needed.

The snap engaging member 52 has three snap engaging arms 521 which are spaced apart from each other. Two snap engaging chambers 522 are formed between the three snap engaging arms 521, respectively. The snap engaging arms 521 are connected to the fourth body 51 from below. The snap engaging chambers 522 can be snap-engaged with optical fiber connectors 2 of the optical fiber connector set 20.

The receiving channel 511 further has a guide body 514. The guide body 514 is positioned between the second resilient arms 42 as soon as the second resilient arms 42 of the removal tool 4 are inserted into the receiving channel 511, such that the second resilient arms 42 of the removal tool 4 are guided into the receiving channel 511. Hence, the precision in the insertion of the second resilient arms 42 into the receiving channel 511 is enhanced.

In conclusion, an optical fiber adapter security of the present invention not only prevents improper use of an optical fiber adapter and inappropriate removal of an optical fiber connector set, but also disables the protection provided by an optical fiber adapter security and an optical fiber connector security, using the same removal tool.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An optical fiber connector security for use with a removal tool, the optical fiber connector security comprising:
    a body having a receiving channel with a coupling unit and two resilient arms, wherein two resilient arms of an optical fiber connector set are inserted into the receiving channel, the two resilient arms of the receiving channel being disposed above the two resilient arms of the optical fiber connector set, respectively, wherein resilient arms of the removal tool are inserted into the receiving channel to abut against the two resilient arms of the receiving channel and press on the two resilient arms of the optical fiber connector set to thereby disconnect protruding portions of the two resilient arms of the optical fiber connector set from slits of an optical fiber adapter, wherein a coupling unit of the removal tool is coupled to the coupling unit of the receiving channel; and
    a snap engaging member connected to the body and snap-engaged with the optical fiber connector set.

2. The optical fiber connector security of claim 1, wherein the coupling unit of the removal tool is a recess, and the coupling unit of the receiving channel is a hook.

3. The optical fiber connector security of claim 2, wherein the receiving channel further has a guide body disposed between the resilient arms of the removal tool.

4. The optical fiber connector security of claim 2, wherein the snap engaging member has three snap engaging arms forming two snap engaging chambers therebetween, the snap engaging arms being connected to the body, and the snap engaging chambers being snap-engaged with an optical fiber connector of the optical fiber connector set.

5. The optical fiber connector security of claim 4, wherein the receiving channel further has a guide body disposed between the resilient arms of the removal tool.

6. The optical fiber connector security of claim 1, wherein the snap engaging member has three snap engaging arms forming two snap engaging chambers therebetween, the snap engaging chambers being snap-engaged with an optical fiber connector of the optical fiber connector set.

7. The optical fiber connector security of claim 6, wherein the receiving channel further has a guide body disposed between the resilient arms of the removal tool.

8. The optical fiber connector security of claim 1, wherein the receiving channel further has a guide body disposed between the resilient arms of the removal tool.

* * * * *